United States Patent
Park et al.

(10) Patent No.: US 9,804,853 B2
(45) Date of Patent: Oct. 31, 2017

(54) APPARATUS AND METHOD FOR COMPRESSING INSTRUCTION FOR VLIW PROCESSOR, AND APPARATUS AND METHOD FOR FETCHING INSTRUCTION

(71) Applicant: SAMSUNG ELECTRONICS CO., LTD., Suwon-si (KR)

(72) Inventors: Jae-Un Park, Seoul (KR); Suk-jin Kim, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 650 days.

(21) Appl. No.: 14/258,640

(22) Filed: Apr. 22, 2014

(65) Prior Publication Data

US 2014/0317383 A1    Oct. 23, 2014

(30) Foreign Application Priority Data

Apr. 22, 2013 (KR) ........................ 10-2013-0044431

(51) Int. Cl.
| | |
|---|---|
| *G06F 15/00* | (2006.01) |
| *G06F 15/76* | (2006.01) |
| *G06F 9/38* | (2006.01) |
| *G06F 9/30* | (2006.01) |

(52) U.S. Cl.
CPC ........ *G06F 9/3853* (2013.01); *G06F 9/30178* (2013.01)

(58) Field of Classification Search
None
See application file for complete search history.

(56) References Cited

U.S. PATENT DOCUMENTS

| | | | |
|---|---|---|---|
| 7,062,634 B1* | 6/2006 | Southwell | G06F 9/30156 712/210 |
| 2001/0042187 A1 | 11/2001 | Tremblay | |
| 2002/0099924 A1* | 7/2002 | Nishioka | G06F 9/30036 712/24 |
| 2008/0235492 A1* | 9/2008 | Baek | G06F 9/30156 712/24 |
| 2009/0063822 A1* | 3/2009 | Yasufuku | G06F 9/30145 712/208 |
| 2011/0202749 A1 | 8/2011 | Jin et al. | |

FOREIGN PATENT DOCUMENTS

| | | |
|---|---|---|
| KR | 10-2005-0102489 A | 10/2005 |
| KR | 10-2008-0086739 A | 9/2008 |
| KR | 10-2011-0095049 A | 8/2011 |

* cited by examiner

*Primary Examiner* — George Giroux
(74) *Attorney, Agent, or Firm* — Sughrue Mion, PLLC

(57) ABSTRACT

Provided are an instruction compression apparatus and method for a very long instruction word (VLIW) processor, and an instruction fetching apparatus and method. The instruction compression apparatus includes: an indicator generator configured to generate an indicator code that indicates an issue width of an instruction bundle to be executed in the VLIW processor, and a number of No-Operation (NOP) instruction bundles following the instruction bundle; an instruction compressor configured to compress the instruction bundle by removing at least one of NOP instructions from the instruction bundle and the NOP instruction bundles following the instruction bundle; and an instruction converter configured to include the generated indicator code in the compressed instruction bundle.

12 Claims, 6 Drawing Sheets

FIG. 2A

| OP0 | OP1 | OP2 | OP3 | ~ R1 |
|-----|-----|-----|-----|------|
| NOP | NOP | NOP | NOP | ~ R2 |
| NOP | NOP | NOP | NOP | ~ R3 |
| NOP | NOP | NOP | NOP | ~ R4 |
| OP4 | OP5 | NOP | NOP | ~ R5 |
| OP6 | OP7 | OP8 | OP9 | ~ R6 |
| NOP | NOP | NOP | NOP | ~ R7 |
| NOP | NOP | NOP | NOP | ~ R8 |

FIG. 2B

| COMPRESSED CODE | | | |
|---|---|---|---|
| OP0 | OP1 | OP2 | OP3 |
| OP4 | OP5 | OP6 | OP7 |
| OP8 | OP9 | | |

APPARATUS AND METHOD FOR COMPRESSING INSTRUCTION FOR VLIW PROCESSOR, AND APPARATUS AND METHOD FOR FETCHING INSTRUCTION

CROSS-REFERENCE TO RELATED APPLICATION

This application claims priority from Korean Patent Application No. 10-2013-0044431, filed on Apr. 22, 2013 in the Korean Intellectual Property Office, the disclosure of which is incorporated herein by reference in its entirety.

BACKGROUND

1. Field

Apparatuses and methods consistent with exemplary embodiments relate to instruction set architecture (ISA) on a computer architecture, and particularly, to an apparatus and method for compressing an instruction for a very long instruction word (VLIW) processor, and an apparatus and method for fetching an instruction.

2. Description of the Related Art

A very long instruction word (VLIW) processor includes a plurality of functional units that execute a plurality of instructions in parallel. Instructions input to the VLIW processor may be grouped into instruction bundles, each including a number of instructions corresponding to the number of functional units, and the instruction bundles are simultaneously executed in the plurality of functional units. A VLIW processor may reduce the time to execute all input instructions by distributing the input instructions among the plurality of functional units.

Theoretically, the maximum number of instructions that can be simultaneously executed by the VLIW processor is the same as the number of functional units. However, due to dependency among instructions, the number of valid instructions that can be executed in parallel at each execution period may be smaller than the number of functional units. For example, due to a failed operation outcome production from a previous instruction, some or all functional units may not process any instructions at a particular time. Such functional units that do not process any instructions are allocated a No-Operation (NOP) instruction.

As a result, an increase in the total number of instructions due to the NOP instructions, unnecessary to the VLIW processor, may deteriorate processor performance. In particular, the increased number of instructions utilizes a larger memory, which may increase a probability of a cache miss, resulting in a slow system speed. In addition, there may be instruction fetch overload due to a large number of instructions.

A method of compressing instructions and storing the compressed instructions has been researched in an effort to prevent the performance deterioration of a VLIW processor. For example, there has been introduced a method of generating a separate operation for removing NOP bundles from all issue slots of a VLIW processor. The separate operation may include information that indicates the number of successive cycles a NOP bundle is to be performed, and a P bit that indicates whether a subsequent operation can be executed in parallel. The separate operation, however, is to be allocated a code, and the information that indicates the number of successive cycles a NOP bundle is to be performed is to be stored in a registry file, which may lead to the reduction of a clock speed in terms of instruction fetch.

SUMMARY

According to an aspect of an exemplary embodiment, there is provided an instruction compression apparatus including: an indicator generator configured to generate an indicator code that indicates an issue width of an instruction bundle to be executed in a VLIW processor, and a number of NOP instruction bundles following the instruction bundle; an instruction compressor configured to compress the instruction bundle by removing at least one of NOP instructions from the instruction bundle and the NOP instruction bundles following the instruction bundle; and an instruction converter configured to include the generated indicator code in the compressed instruction bundle.

The issue width of the instruction bundle may be determined based on at least one of a maximum issue width available in the VLIW processor, and a number of NOP instructions included in the instruction bundle.

A value of the issue width of the instruction bundle may be variably determined as a multiple of two or more, within the maximum issue width available in the VLIW processor.

A maximum number of NOP instruction bundles removable by the instruction compressor may be determined based on the issue width of the instruction bundle.

The indicator code may include a plurality of bits, each of which corresponds to a stop bit of each instruction of the instruction bundle.

The instructions of the instruction bundle may be remaining instructions that are not removed by the instruction compressor.

The instruction converter may be configured to replace the stop bit of each instruction of the instruction bundle with a corresponding bit value of the indicator code.

According to an aspect of another exemplary embodiment, there is provided an instruction compression method including: generating an indicator code that indicates an issue width of an instruction bundle to be executed in a VLIW processor, and a number of NOP instruction bundles following the instruction bundle; compressing the instruction bundle by removing at least one of NOP instructions from the instruction bundle and the NOP instruction bundles following the instruction bundle; and including the generated indicator code in the compressed instruction bundle.

The issue width of the instruction bundle may be determined based on at least one of a maximum issue width available in the VLIW processor and a number of NOP instructions included in the instruction bundle.

A value of the issue width of the instruction bundle may be variably determined as a multiple of two or more, within the maximum issue width available in the VLIW processor.

A maximum number of NOP instruction bundles removable in the compressing may be determined based on the issue width of the instruction bundle.

The indicator code may include a plurality of bits, each of which corresponds to a stop bit of each instruction of the instruction bundle.

The instructions of the instruction bundle may be remaining instructions that are not removed in the compressing.

The including the indicator code may include replacing the stop bit of each instruction of the compressed instruction bundle with a corresponding bit value of the indicator code.

According to an aspect of another exemplary embodiment, there is provided an instruction fetching apparatus for a processor, the instruction fetching apparatus including: an instruction selector configured to select, from an instruction cache, an instruction bundle at an address indicated by a program counter (PC); an instruction buffer configured to store the instruction bundle selected by the instruction selector; and a NOP bundle controller configured to control, based on an indicator code corresponding to the instruction bundle forwarded from the instruction buffer to an instruction decoder in a current cycle, fetch of another instruction bundle in a subsequent cycle.

In a case where an instruction bundle is not at the address indicated by the PC, the instruction selector may be configured to fetch the instruction bundle from an external memory, write the fetched instruction bundle in the instruction cache, and select the fetched instruction bundle.

The NOP bundle controller may be configured to extract the indicator code based on a value of a stop bit of each instruction included in the instruction bundle forwarded to the instruction decoder in the current cycle.

The NOP bundle controller may be configured to determine, based on a value of a stop bit of a first instruction included in the instruction bundle in the current cycle, a size of the indicator code to be extracted.

The NOP bundle controller may be configured to determine, based on the extracted indicator code, an NOP bundle cycle in which an NOP instruction bundle is present after the current cycle, and to prevent fetching of the NOP instruction bundle that is to be sent to the instruction decoder from being fetched from the instruction buffer during the determined NOP bundle cycle.

The NOP bundle controller may be configured to control the instruction decoder to retain an instruction bundle forwarded in a previous cycle while preventing the NOP instruction bundle from being fetched during the determined NOP bundle cycle, and to transmit a signal to the instruction decoder so as to notify that the retained instruction bundle is not valid during the NOP bundle cycle.

According to an aspect of another exemplary embodiment, there is provided an instruction fetching method including: selecting, from an instruction cache, an instruction bundle at an address indicated by a program counter; storing the instruction bundle selected by the instruction selector; and controlling, based on an indicator code corresponding to the instruction bundle forwarded from the instruction buffer to an instruction decoder in a current cycle, fetch of another instruction bundle in a subsequent cycle.

The selecting the instruction bundle may include, in a case where an instruction bundle is not at the address indicated by the PC: fetching the instruction bundle from an external memory; writing the fetched instruction bundle in the instruction cache; and selecting the fetched instruction bundle.

The controlling the fetch of the other instruction bundle may include extracting the indicator code based on a value of a stop bit of each instruction included in the instruction bundle forwarded to the instruction decoder in the current cycle.

The extracting the indicator code may include determining, based on a value of a stop bit of a first instruction included in the instruction bundle in the current cycle, a size of the indicator code to be extracted.

The controlling the fetch of the other instruction bundle may include: determining, based on the extracted indicator code, an NOP bundle cycle in which an NOP instruction bundle is present after the current cycle; and preventing the NOP instruction bundle that is to be sent to the instruction decoder from being fetched from the instruction buffer during the determined NOP bundle cycle.

The controlling the fetch of the other instruction bundle may further include: controlling the instruction decoder to retain an instruction bundle forwarded in a previous cycle while preventing the NOP instruction bundle from being fetched during the determined NOP bundle cycle; and transmitting a signal to the instruction decoder so as to notify that the retained instruction bundle is not valid during the NOP bundle cycle.

According to an aspect of another exemplary embodiment, there is provided an instruction compression method including: determining at least one of NOP instructions included in an instruction bundle to be executed in a very long instruction word (VLIW) processor and a number of No-Operation (NOP) instruction bundles following the instruction bundle; and compressing the instruction bundle by deleting the at least one of the NOP instructions from the instruction bundle and the NOP instruction bundles following the instruction bundle.

BRIEF DESCRIPTION OF THE DRAWINGS

The above and/or other aspects will be more apparent by describing exemplary embodiments with reference to the accompanying drawings, in which:

FIG. 2A is a diagram illustrating an example of instructions that have not been yet compressed by the instruction compression apparatus shown in FIG. 1;

FIG. 2B is a table showing examples of compressed instructions of FIG. 2A;

DETAILED DESCRIPTION

Figure 1:
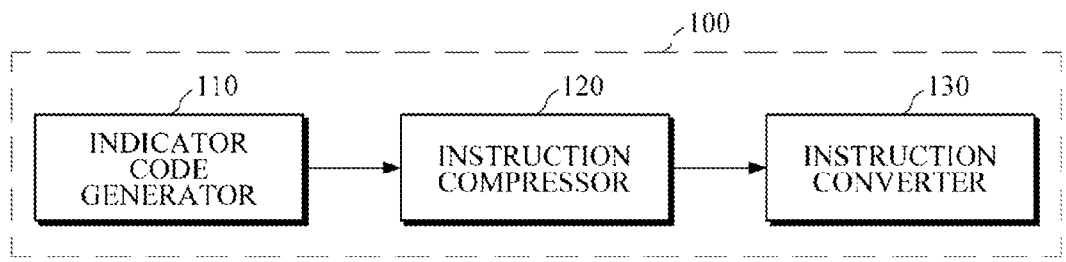
FIG. 1 is a diagram illustrating an instruction compression apparatus according to an exemplary embodiment.

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness. It is understood that expressions such as "at least one of," when preceding a list of elements, modify the entire list of elements and do not modify the individual elements of the list.

Throughout the drawings and the detailed description, unless otherwise described, the same drawing reference numerals will be understood to refer to the same elements, features, and structures. The relative size and depiction of these elements may be exaggerated for clarity, illustration, and convenience.

Hereinafter, exemplary embodiments of an apparatus and method for compressing an instruction for a very long instruction word (VLIW) processor, and of an apparatus and method for fetching an instruction, will be described in detail with reference to the accompanying drawings.

FIG. 1 is a diagram illustrating an instruction compression apparatus 100 according to an exemplary embodiment. The apparatus 100 may efficiently compress a No-Operation (NOP) instruction for a VLIW processor with a variable issue width of a multiple of two or more numbers.

Referring to FIG. 1, the apparatus 100 may include an indicator code generator 110, an instruction compressor 120, and an instruction converter 130. The indicator code generator 110, the instruction compressor 120, and the instruction converter 130 are logically distinguished by their operations, and any two or more thereof may be integrated into one device. In addition, the elements 110, 120, and 130 are distinguished in terms of logical operations for the convenience of explanation, and part of an operation performed by one element may be performed by other elements as long as such implementation does not depart from the spirit and scope of exemplary embodiments.

The indicator code generator 110 generates an indicator code with respect to an instruction bundle to be executed in the VLIW processor. The indicator code indicates an issue width of the instruction bundle, and information about the number of NOP instruction bundles following the instruction bundle. Here, the instruction bundle refers to a group of instructions to be executed in one cycle in the VLIW processor, and may include both valid instructions and NOP instructions. The valid instruction refers to an instruction that instructs a functional unit of the processor to execute a predetermined operation. Furthermore, it is understood that the type and complexity of the predetermined operation, and dependencies between operations are not limited. The NOP instruction refers to an instruction that instructs a functional unit of the processor to execute no operation at the time of instruction input. The NOP instruction bundle refers to a group of instructions that are all NOP instructions input in one cycle.

The issue width of an instruction bundle may indicate information about the number of instructions to be executed in the processor in one cycle. This is related to the number of NOP instructions, which are not executed in the same cycle. For example, with respect to a VLIW processor with a variable issue width of either two or four, an instruction bundle may have an issue width of two or four. If an instruction bundle has an issue width of two in one cycle, it may be understood that the instruction bundle includes two valid instructions and two NOP instructions. Additionally, in this case, if the instruction bundle has an issue width of four in one cycle, it may be understood that the instruction bundle includes four valid instructions and no NOP instructions.

The issue width of an instruction bundle may be determined based on at least one of information about an issue width available in the processor (i.e., a maximum issue width for the processor), and the number of NOP instructions included in the instruction bundle. For example, a value of the issue width may be variably determined as an integer multiple of two or more numbers, within the maximum issue width available in the processor.

The information about the number of NOP instructions following the corresponding instruction bundle indicates how many successive NOP instruction bundles are present after the cycle in which the instruction bundle is executed. To this end, the indicator code may include two or more bits. For example, the indicator code may correspond to a stop bit of each instruction belonging to an instruction bundle, more specifically, a group of undeleted instructions.

As such, the indicator code may indicate whether an instruction bundle in a particular cycle includes an NOP instruction, and the number of NOP instructions present in the instruction bundle, and may also indicate how many successive NOP instruction bundles are present in a cycle following the particular cycle. As set forth above, the NOP instruction bundle includes only NOP instructions.

is the below Table 1 shows examples of an indicator code generated by the indicator code generator 110 for a VLIW processor with a variable issue width of two or four, i.e., with a maximum issue width of four.

TABLE 1

| Indicator Code [0:3] | Description |
| --- | --- |
| 0 0 1 0 | Issue Width - 4, Number of Subsequent NOP Instruction Bundles - 0 |
| 0 0 1 1 | Issue Width - 4, Number of Subsequent NOP Instruction Bundles - 2 |
| 0 1 1 0 | Issue Width - 4, Number of Subsequent NOP Instruction Bundles - 1 |
| 0 1 1 1 | Issue Width - 4, Number of Subsequent NOP Instruction Bundles - 3 |
| 1 0 0 0 | Issue Width - 2, Number of Subsequent NOP Instruction Bundles - 0 |
| 1 0 0 1 | Issue Width - 2, Number of Subsequent NOP Instruction Bundles - 0 |
| 1 0 1 0 | Issue Width - 2, Number of Subsequent NOP Instruction Bundles - 0 |
| 1 0 1 1 | Issue Width - 2, Number of Subsequent NOP Instruction Bundles - 0 |
| 1 1 0 0 | Issue Width - 2, Number of Subsequent NOP Instruction Bundles - 1 |
| 1 1 0 1 | Issue Width - 2, Number of Subsequent NOP Instruction Bundles - 1 |
| 1 1 1 0 | Issue Width - 2, Number of Subsequent NOP Instruction Bundles - 1 |
| 1 1 1 1 | Issue Width - 2, Number of Subsequent NOP Instruction Bundles - 1 |

Referring to Table 1, since the indicator code in the present exemplary embodiment corresponds to stop bits of all instructions belonging to an instruction bundle as described above, a total of four bits may constitute the indicator code, corresponding to stop bits of at most four instructions. In the present exemplary embodiment, bit [0] and bit [2] of the indicator code indicate information about an issue width, and bit [1] and bit [3] indicate the number of the subsequent NOP instruction bundles, although it is understood that one or more other exemplary embodiments are not limited to this arrangement of bits. For example, bit [0] with a value of "0" indicates an issue width of four, and a value of "1" indicates an issue width of two. A two-bit value, "00," as a value of bit [1] and bit [3] indicates no successive NOP instruction bundles, "10" indicates one successive NOP instruction bundle, "01" indicates two successive NOP instruction bundles, and "11" indicates three successive NOP instruction bundles present in the next cycles.

In addition, when bit [0] has a value of "1," the indicator code indicates that the corresponding instruction bundle has an issue width of two, and NOP instructions are included in the remaining two-issue. In the present exemplary embodiment, only a value of bits [1:0] is significant to the indicator code for an issue width of two, and a value of remaining bits [3:2] may not be taken into consideration in an instruction fetching stage. This is because, as described below, when a compressed instruction code is stored in memory, the NOP instructions in the remaining two-issue are deleted, and an instruction of two-issue included in another instruction bundle present in the subsequent cycle is stored in the memory.

The instruction compressor 120 may delete at least one of an NOP instruction belonging to an instruction bundle, and an NOP instruction bundle following that instruction bundle, in accordance with the indicator code generated by the indicator code generator 110.

For example, in a case where, with respect to a VLIW processor with a variable issue width of two or four, an indicator code of an instruction bundle indicates that an issue width is two in a particular cycle, two NOP instructions can be deleted in the particular cycle. In addition, when the indicator code indicates that the number of successive NOP instruction bundles is three, three successive NOP instruction bundles can be deleted after the particular cycle. As described above, the substantively meaningful information is determined by the issue width, and thus the number of NOP instructions and NOP instruction bundles that the instruction compressor 120 can delete may be determined by the issue width information. In this regard, the instruction compressor 120 may determine the NOP instructions and NOP instruction bundles to delete based on the generated indicator code, or may determine the NOP instructions and NOP instruction bundles to delete directly from the instructions.

The instruction convertor 130 includes the generated indicator code in the instruction bundle, which is, for example, a group of instructions that are not deleted by the instruction compressor 120. For example, the indicator code may replace stop bits of instructions belonging to the instruction bundle. The indicator code may, hence, include bits, each of which corresponds to a stop bit of each instruction in the instruction bundle. However, it is understood that aspects of one or more other exemplary embodiments are not limited thereto, and a method for including the indicator code in an instruction bundle is not limited. Furthermore, according to one or more other exemplary embodiments, the indicator code may be provided separately from the compressed instruction bundle.

FIG. 2A is a diagram illustrating an example of instructions which have not yet been compressed by the instruction compression apparatus 100 shown in FIG. 1. In FIG. 2A, eight instruction groups R1 through R8 are shown. Each instruction group is executed in a processor in each cycle. As shown in FIG. 2A, the instruction groups R1, R5, and R6 are instruction bundles, each including at least one valid instruction, and the remaining instruction groups R2, R3, R4, R7, and R8 are NOP instruction bundles, each including only NOP instructions. For the eight instruction groups, each including four 32-bit instructions, a total of 128 bytes is used in memory to store the instructions groups R1 through R8.

The indicator code generator 110 may generate indicator codes, as shown in Table 2, for the instruction bundles R1, R5, and R6, which are not NOP instruction bundles.

TABLE 2

| Instruction Bundle | Indicator Code [3:0] |
|---|---|
| R1 | 1110 |
| R5 | 0001 |
| R6 | 1100 |

Referring to FIG. 2A and Table 2, instruction bundle R1 includes no NOP instructions, and thus has an issue width of four. Hence, bit [0] has a value of "0", and bit[2] has a value of "1" that represents the last two-issue width. Since three NOP instruction bundles R2, R3, and R4 successively follow instruction bundle R1, bit [3] has a value of "1" and bit [1] has a value of "1." Bits [3:0] of the indicator code each correspond to a stop bit of each of four instructions OP3, OP2, OP1, and OP0.

In addition, since instruction bundle R5 includes two valid instructions OP4 and OP5, and two NOP instructions, the instruction bundle R5 has an issue width of two. Without the subsequent NOP instruction bundle, bit [0] has a value of "1" and bit [1] has a value of "0." As described above, values of bits [2] and [3] are not considered. Instruction bundle R6 includes four valid instructions OP6, OP7, OP8, and OP9, and is followed by two successive NOP instruction bundles R7 and R8, and thus an indicator code [3:0] is "1100."

FIG. 2B is a table showing examples of compressed instructions of FIG. 2A. The examples of instructions shown in FIG. 2B are stored in memory after the instruction compressor 120 has deleted NOP instructions from the instruction groups shown in FIG. 2A using the indicator codes generated by the indicator code generator 110. The instruction compressor 120 deletes NOP instruction bundles R2, R3, R4, R7, and R8 and deletes NOP instructions from instruction bundle R5, based on the generated indicator codes. Referring to FIG. 2B, the instructions after compression uses 40 bytes in the memory, thereby reducing memory consumption, when compared to the instructions before compression.

The instruction converter 130 includes the generated indicator code in the corresponding instruction bundle, wherein the stop bit of each instruction included in the instruction bundle may be replaced with a value corresponding to the indicator code.

Figure 3:
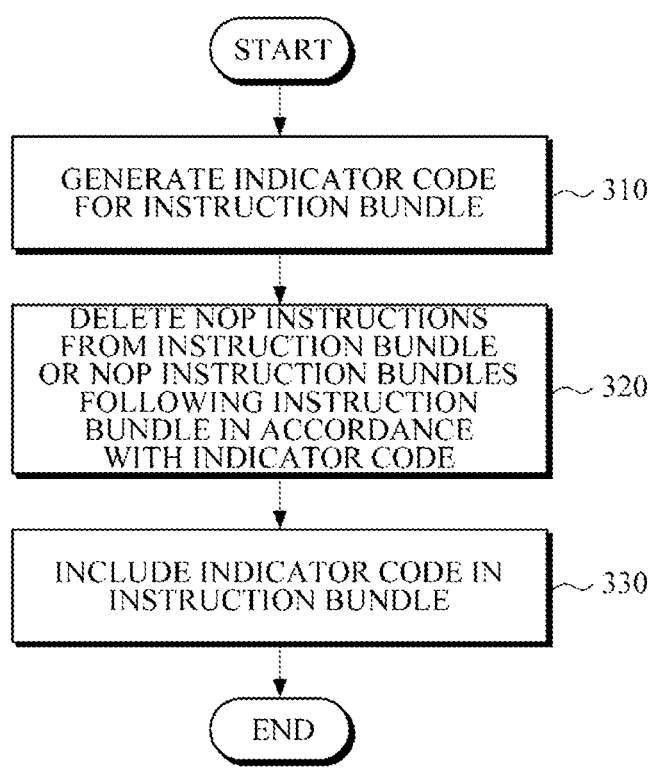
FIG. 3 is a flowchart illustrating an instruction compression method according to an exemplary embodiment.

FIG. 3 is a flowchart illustrating an instruction compression method according to an exemplary embodiment. At least some operations of the flowchart of FIG. 3 may not be sequentially ordered, and may be switched in order or performed at the same time in one or more exemplary embodiments. The method shown in FIG. 3 may be performed by the instruction compression apparatus 100 shown in FIG. 1, and thus descriptions of the same elements will not be reiterated to avoid unnecessary repetition.

Referring to FIG. 3, in operation 310, indicator codes are generated for instruction bundles to be executed in a VLIW processor, wherein each indicator code indicates an issue width of a corresponding instruction bundle, and the number of NOP instruction bundles following the corresponding instruction bundle. As shown in Table 1, the issue width of the instruction bundle may indicate information about the number of instructions to be processed by the processor in the same cycle, in other words, information about the number of NOP instructions in the same cycle. In addition, the indicator code may include information about the number of successive NOP instruction bundles after the cycle in which the corresponding instruction bundle is processed. The indicator code may include two or more bits that correspond to stop bits of instructions included in the relevant instruction bundle.

In operation 320, NOP instructions included in each instruction bundle and/or one or more NOP instruction bundles following each instruction bundle, are deleted in accordance with the indicator codes generated in operation 310. In operation 330, each generated indicator code is included in each instruction bundle after the NOP instructions and NOP instruction bundles have been deleted therefrom in operation 320. At this time, various methods may be used to include the indicator codes with the instruction bundles, and, for example, stop bits of instructions included in each instruction bundle may be replaced with corresponding bit values of the indicator code.

Figure 4:
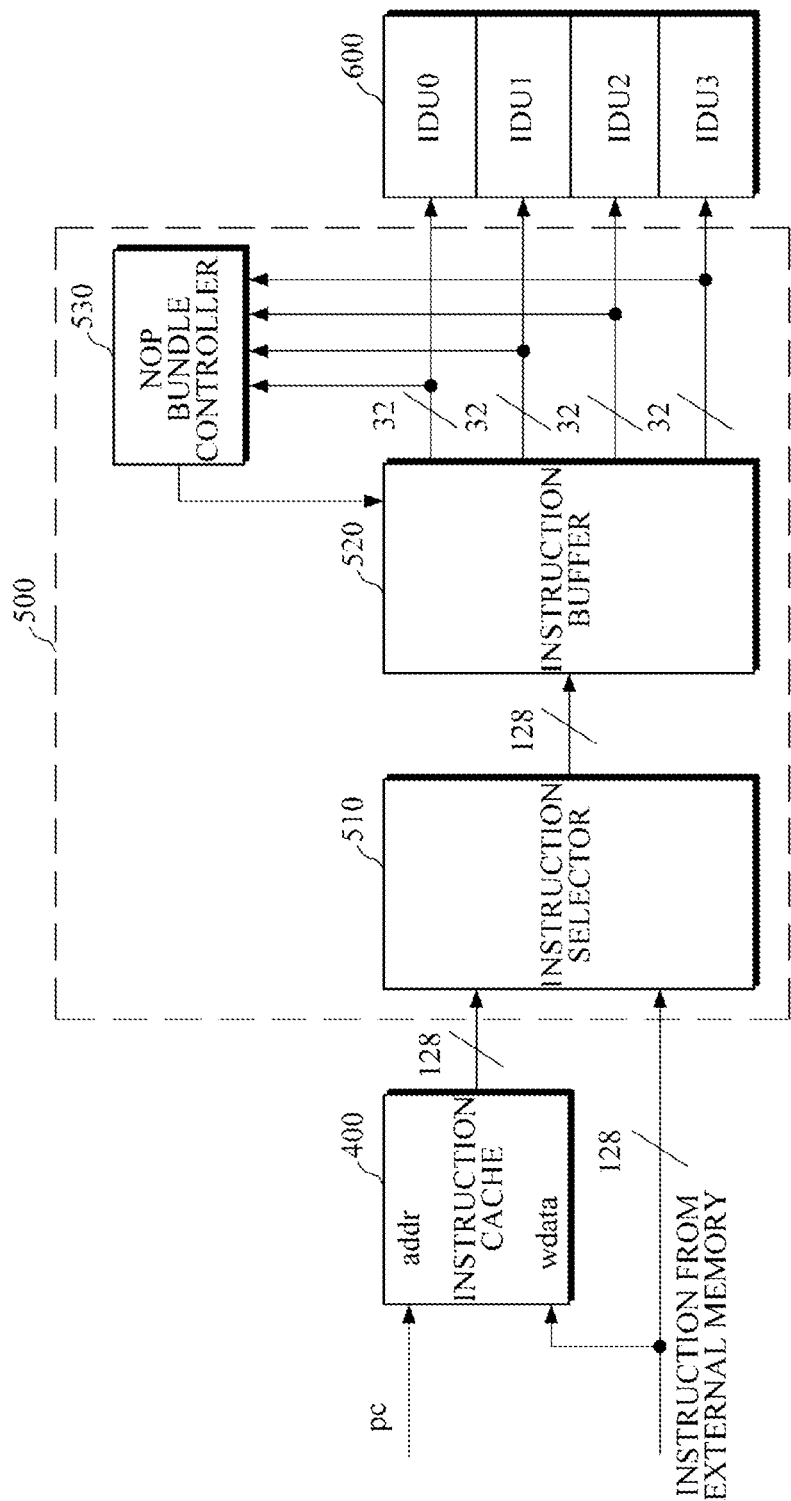
FIG. 4 is a diagram illustrating an instruction fetching apparatus according to an exemplary embodiment.

FIG. 4 is a diagram illustrating an instruction fetching apparatus 500 according to an exemplary embodiment.

The instruction fetching apparatus 500 shown in FIG. 4 may be included in the VLIW processor with a variable issue width as described above. For example, the apparatus 500 may be a part of a front end unit that fetches an instruction from the VLIW processor, and decodes the instruction. The apparatus 500 fetches an instruction bundle from an instruction cache 400, and forwards the fetched instruction bundle to an instruction decoder 600. In the instruction cache 400, the instruction compression apparatus 100 of FIG. 1 stores the instruction bundle which is generated by compressing instructions.

Referring to FIG. 4, the apparatus 500 includes an instruction selector 510, an instruction buffer 520, and a NOP bundle controller 530.

As described above, the instruction compression apparatus 100 generates an indicator code, includes the indicator code in the instruction bundle, and stores the instruction bundle with the indicator code in the instruction cache 400. The instruction selector 510 may input a part of a program counter (PC) as an address of the instruction cache 400, select and fetch a corresponding instruction bundle at the address, and store the instruction bundle in the instruction buffer 520.

If an instruction bundle is not present at the address in the instruction cache 400, an instruction bundle is fetched from an external memory and written in the instruction cache 400, and the written instruction bundle is selected. Then, the selected instruction bundle is stored in the instruction buffer 520. In this case, the instruction buffer 520 may be a queue, and control the delivery of the instruction bundle to the instruction decoder 600.

The NOP bundle controller 530 controls the fetch of an instruction bundle in the subsequent cycle, based on the indicator code included in the instruction bundle that is forwarded from the instruction buffer 520 to the instruction decoder 600 in the current cycle. In addition, the NOP bundle controller 530 may determine and control an NOP instruction in the current cycle.

As an example of a case where the instruction fetching apparatus 500 fetches an instruction bundle that is generated and stored by the instruction compression apparatus 100 that compresses instructions, the instruction selector 510 may fetch a 128-bit instruction bundle including four 32-bit instructions, at an address of an instruction cache indicated by PC. The fetched 128-bit instruction bundle is stored in the instruction buffer 520, then, is divided into instructions in units of 32 bits upon the arrival of a corresponding cycle, and the divided instructions are forwarded to the corresponding instruction decoder 600 IDU0, IDU1, IDU2, and IDU3.

In this case, the NOP bundle controller 530 may extract the indicator code by reading stop bits of the respective divided 32-bit instructions. Based on the extracted indicator code, the NOP bundle controller 530 determines an NOP bundle cycle in which an NOP instruction bundle is present after the current cycle. That is, the NOP bundle controller 530 may determine how many successive cycles are NOP bundle cycles, and prevents an instruction bundle that is to be sent to the instruction decoder 600 from being fetched from the instruction buffer 520 during the NOP bundle cycle.

Below is shown examples of extracted indicator codes, and instructions forwarded to the instruction decoder 600 in accordance with the indicator codes, according to an exemplary embodiment.

TABLE 3

| Cycle | Indicator Code [3:0] | Instruction(s) to Be Forwarded |
|---|---|---|
| 1 | 0011 | OP0, OP1, NOP, NOP |
| 2 | | NOP Bundle |
| 3 | 1100 | OP5, OP6, OP7, OP8 |
| 4 | | NOP Bundle |
| 5 | | NOP Bundle |
| 6 | 1110 | OP9, OP10, OP11, OP12 |
| 7 | | NOP Bundle |
| 8 | | NOP Bundle |
| 9 | | NOP Bundle |

Procedures for fetching an instruction bundle from the instruction buffer 520 in accordance with the indicator code extracted by the NOP bundle controller 530, and an instruction that is truly forwarded to the instruction decoder 600 will now be described with reference to Table 3.

In cycle 1, an indicator code [3:0] that the NOP bundle controller 530 has extracted from stop bits of instructions that are forwarded to the instruction decoder 600 is "0011." Since a value of bit [0] for indicating an issue width is "1," the instruction bundle in the current cycle has an issue width of 2. In this case, bit [0] may be a value of a stop bit of the first instruction included in the instruction bundle in cycle 1. Accordingly, two valid instructions OP0 and OP1, and two NOP instructions, are to be forwarded.

The NOP bundle controller 530 may transmit a signal (e.g., 0) to the instruction decoder 600 in order to indicate invalid instructions corresponding to NOP instructions among the four instructions of the instruction bundle forwarded to the instruction decoder 600 in cycle 1.

Moreover, since the indicator code indicates an issue width as 2, a value of the remaining bits [3:2] is not considered. Accordingly, the number of NOP bundle cycles, in each of which an NOP instruction bundle is present, subsequent to the current cycle, is indicated by bit [1] with a value of "1." The NOP bundle controller 530 determines that cycle 2 following cycle 1 is an NOP bundle cycle, and prevents fetching of another instruction bundle from the instruction buffer 520 in cycle 2. In addition, the NOP bundle controller 530 controls the instruction decoder 600 to retain the instruction bundle forwarded in cycle 1, and transmits a signal (e.g., 0) to the instruction decoder 600 to indicate that the retained instruction bundle is not valid.

At the onset of cycle 3, an instruction bundle is fetched from the instruction buffer 520, and then divided into instructions in units of 32 bits, and the divided instructions are forwarded to the instruction decoder 600. Referring to Table 3, an indicator code [3:0] extracted by the NOP bundle controller 530 is "1100." Accordingly, "10" as a value of bits [2] and [0] indicates that an issue width is four, and "10" as a value of bits [3] and [1] indicates that the number of NOP bundle cycles is two.

Hence, instructions to be forwarded to the instruction decoder 600 in cycle 3 are all valid instructions OP5, OP6, OP7, and OP8. During the next cycles 4 and 5, another instruction bundle is prevented from being fetched from the instruction buffer 520, and the instruction forwarded in cycle 3 is retained in the instruction decoder 600, under the control of the NOP bundle controller 530. The NOP bundle controller 530 transmits a signal to the instruction decoder 600 so as to notify that the retained instruction is not valid, during cycles 4 and 5.

Likewise, in cycle 6, an instruction bundle is forwarded from the instruction buffer 520 to the instruction decoder 600. Referring to Table 3, an indicator code [3:0] is "1110,"

which indicates that an issue width is 4, and the number of NOP bundle cycles is 3. The NOP bundle controller 530 controls a result from cycle 6 to be maintained during cycles 7, 8, and 9, and at the same time, continuously transmits a signal to the instruction decoder 600 so as to notify that the instruction retained during cycles 7, 8, and 9 is not valid.

Figure 5:
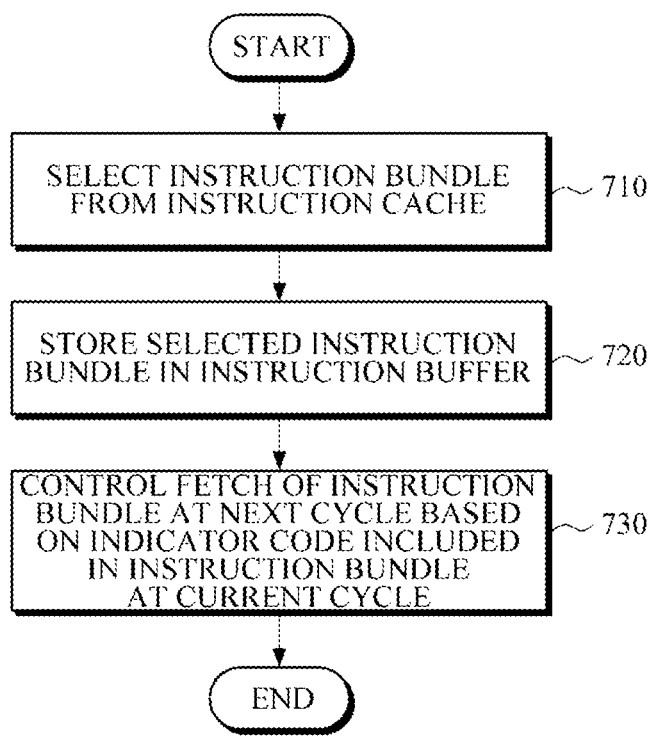
FIG. 5 is a flowchart illustrating an instruction fetching method according to an exemplary embodiment.

FIG. 5 is a flowchart illustrating an instruction fetching method according to an exemplary embodiment. The method of FIG. 5 may be performed by the instruction fetching apparatus 500 of FIG. 4. As described in detail with reference to FIG. 4, descriptions of the same elements will be omitted to avoid unnecessary repetition.

Referring to FIG. 5, in operation 710, a part of PC is input as an address of the instruction cache 400, and an instruction bundle at the address is selected and fetched from the instruction cache 400. Then, in operation 720, the fetched instruction bundle is stored in the instruction buffer 520. If an instruction bundle is not present at the address in the instruction cache 400, an instruction bundle is fetched from an external memory, and written to the instruction cache 400, and then the written instruction bundle may be selected.

Then, in operation 730, an indicator code is extracted from the instruction bundle to be forwarded from the instruction buffer 520 to the instruction decoder 600 in the current cycle, and based on the extracted indicator code, NOP instructions in the current cycle or the fetch of an instruction bundle of the next cycle is controlled.

In this case, the instruction bundle may be a 128-bit instruction including four 32-bit instructions, and the indicator code may be extracted by reading stop bits of each of 32-bit instructions that are divided from the instruction bundle so as to be forwarded to the instruction decoder 600.

Based on the extracted indicator code, an NOP instruction that is to be forwarded to the instruction decoder 600 at the current cycle is determined, and then a signal may be transmitted to the instruction decoder 600 so as to notify that instructions corresponding to the NOP instructions, among the forwarded instructions, are not valid.

In addition, an NOP bundle cycle in which an NOP instruction bundle is present after the current cycle is determined based on the extracted indicator code, and the NOP instruction bundle is prevented from being fetched from the instruction buffer 520. Further, while another instruction bundle is prevented from being fetched from the instruction buffer 520, the instruction decoder 600 is controlled to retain the instruction bundle forwarded in the previous cycle, and a signal is transmitted to the instruction decoder 600 so as to notify that the retained instruction bundle is not valid.

An exemplary embodiment can be implemented as computer readable codes in a computer readable record medium. Codes and code segments constituting the computer program can be easily inferred by a skilled computer programmer in the art. The computer readable record medium includes all types of record media in which computer readable data are stored. Examples of the computer readable record medium include a ROM, a RAM, a CD-ROM, a magnetic tape, a floppy disk, and an optical data storage. In addition, the computer readable record medium may be distributed to computer systems over a network, in which computer readable codes may be stored and executed in a distributed manner. Moreover, it is understood that in exemplary embodiments, one or more units of the above-described elements can include circuitry, a processor, a microprocessor, etc., and may be implemented by one or more processors as a computer program stored in a computer-readable medium.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An instruction compression apparatus comprising:
   an indicator generator configured to generate an indicator code that indicates an issue width of an instruction bundle to be executed in a very long instruction word (VLIW) processor, and a number of No-Operation (NOP) instruction bundles following the instruction bundle;
   an instruction compressor configured to compress the instruction bundle by removing at least one of NOP instructions from the instruction bundle and the NOP instruction bundles following the instruction bundle; and
   an instruction converter configured to include the generated indicator code in the compressed instruction bundle,
   wherein the instruction converter is configured to replace a stop bit of each instruction of the compressed instruction bundle with a corresponding bit value of the indicator code.

2. The instruction compression apparatus of claim 1, wherein the issue width of the instruction bundle is determined based on at least one of a maximum issue width available in the VLIW processor, and a number of NOP instructions included in the instruction bundle.

3. The instruction compression apparatus of claim 2, wherein a value of the issue width of the instruction bundle is variably determined as a multiple of two or more, within the maximum issue width available in the VLIW processor.

4. The instruction compression apparatus of claim 1, wherein a maximum number of NOP instruction bundles removable by the instruction compressor is determined based on the issue width of the instruction bundle.

5. The instruction compression apparatus of claim 1, wherein the instructions of the compressed instruction bundle are remaining instructions that are not removed by the instruction compressor.

6. An instruction fetching apparatus for a processor, the instruction fetching apparatus comprising:
   an instruction selector configured to select, from an instruction cache, an instruction bundle at an address indicated by a program counter (PC);
   an instruction buffer configured to store the instruction bundle selected by the instruction selector; and
   a No-Operation (NOP) bundle controller configured to control, based on an indicator code corresponding to the instruction bundle forwarded from the instruction buffer to an instruction decoder in a current cycle, fetch of another instruction bundle in a subsequent cycle,
   wherein the NOP bundle controller is configured to extract the indicator code based on a value of a stop bit of each instruction included in the instruction bundle forwarded to the instruction decoder in the current cycle, and
   wherein the NOP bundle controller is configured to determine, based on a value of a stop bit of a first instruction included in the instruction bundle in the current cycle, a size of the indicator code to be extracted.

7. The instruction fetching apparatus of claim 6, wherein in a case where the instruction bundle is not at the address indicated by the PC, the instruction selector is configured to fetch the instruction bundle from an external memory, write the fetched instruction bundle in the instruction cache, and select the fetched instruction bundle.

8. The instruction fetching apparatus of claim 6, wherein the NOP bundle controller is configured to determine, based on the extracted indicator code, an NOP bundle cycle in which an NOP instruction bundle is present after the current cycle, and to prevent the NOP instruction bundle from being fetched from the instruction buffer during the determined NOP bundle cycle.

9. The instruction fetching apparatus of claim 8, wherein the NOP bundle controller is configured to control the instruction decoder to retain an instruction bundle forwarded in a previous cycle while preventing the NOP instruction bundle from being fetched during the determined NOP bundle cycle, and to transmit a signal to the instruction decoder so as to notify that the retained instruction bundle is not valid during the NOP bundle cycle.

10. An instruction compression method comprising:
  determining at least one of No-Operation (NOP) instructions included in an instruction bundle to be executed in a very long instruction word (VLIW) processor and a number of NOP instruction bundles following the instruction bundle;
  generating an indicator code that indicates an issue width of the instruction bundle and the number of the NOP instruction bundles following the instruction bundle; and
  compressing the instruction bundle by removing the at least one of the NOP instructions from the instruction bundle and the NOP instruction bundles following the instruction bundle,
  wherein the compressing replaces a stop bit of each instruction of the compressed instruction bundle with a corresponding bit value of the indicator code.

11. The instruction compression method of claim 10, wherein the issue width of the instruction bundle is determined based on at least one of a maximum issue width available in the VLIW processor and a number of the NOP instructions included in the instruction bundle.

12. The instruction compression method of claim 10, wherein a maximum number of NOP instruction bundles removable in the compressing is determined based on a determined issue width of the instruction bundle.

* * * * *